United States Patent [19]
Checco

[11] Patent Number: 5,859,898
[45] Date of Patent: Jan. 12, 1999

[54] MESSAGING ARCHITECTURE SUPPORTING DIGITAL AND ANALOG MEDIA

[75] Inventor: John Checco, Stony Point, N.Y.

[73] Assignee: Nynex Science & Technology, White Plains, N.Y.

[21] Appl. No.: 714,953

[22] Filed: Sep. 17, 1996

[51] Int. Cl.$^6$ .............................. H04M 1/64; G06F 13/00
[52] U.S. Cl. .................................... 379/88.01; 379/88.07; 379/88.17; 379/88.23; 379/88.13
[58] Field of Search .................................. 379/67, 88, 89, 379/88.07, 88.17, 88.22, 88.23, 88.1, 88.08, 88.13; 395/200.56, 200.59, 200.71, 674, 675

[56] References Cited

U.S. PATENT DOCUMENTS

| | | | |
|---|---|---|---|
| 5,333,266 | 7/1994 | Boaz et al. | 379/88 |
| 5,475,738 | 12/1995 | Penzias | 379/67 |
| 5,491,784 | 2/1996 | Douglas et al. | 395/159 |
| 5,497,373 | 3/1996 | Hulen et al. | 379/89 |
| 5,499,288 | 3/1996 | Hunt et al. | 379/88 |
| 5,530,740 | 6/1996 | Irribarren et al. | 379/89 |
| 5,555,346 | 9/1996 | Gross et al. | 395/51 |
| 5,692,192 | 11/1997 | Sudo | 395/675 |
| 5,717,742 | 2/1998 | Hyde-Thomson | 379/88 |

*Primary Examiner*—Daniel S. Hunter
*Attorney, Agent, or Firm*—Proskauer Rose LLP

[57] ABSTRACT

A message system includes voice or data messages and which allows such messages to be retrieved at the convenience of the recipient. A preferred data messaging system architecture according to the present invention includes a digital signal processor at a communications entry point, an operational API, a number of calling device personality and rules sets, a storage input/output, and voice and data message storage. The digital signal processor determines the type of communications device contacting the system. The operational API interacts with the calling device to a set of operating rules. These rules specify the calling device's abilities to navigate through a messaging path and provide capability which may be required for the calling device type. The calling device personality and rules set modules preferably contain a feature set for the particular type of communication device. Each personality and rules set module preferably contains all the resources needed for navigation and operations, such as storing, retrieving, and converting to and from other types of formats. The storage input/output provides an interface between the personality and rules set module and the voice and data message storage. The voice and data message storage maintains the messages and other information.

25 Claims, 6 Drawing Sheets

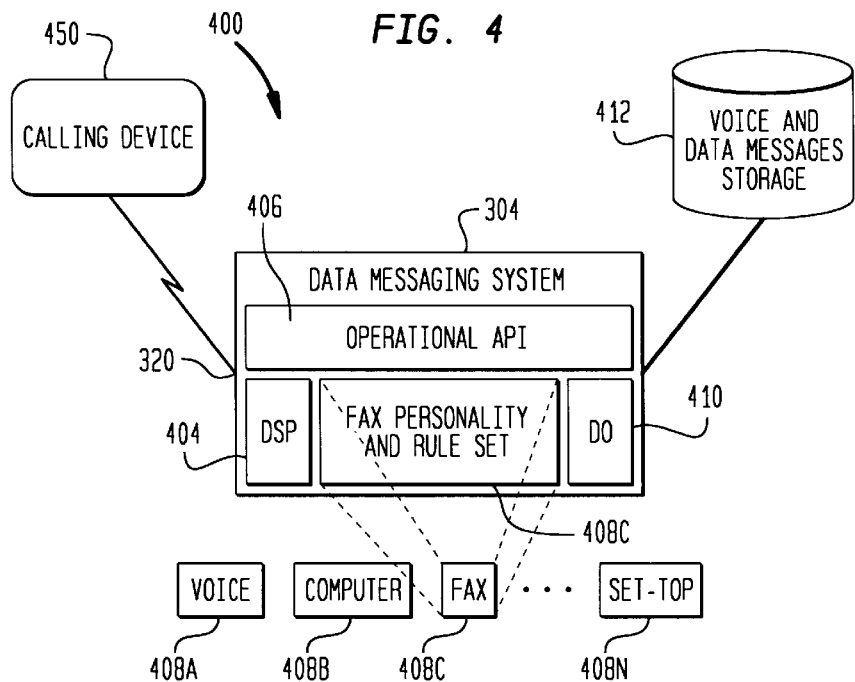
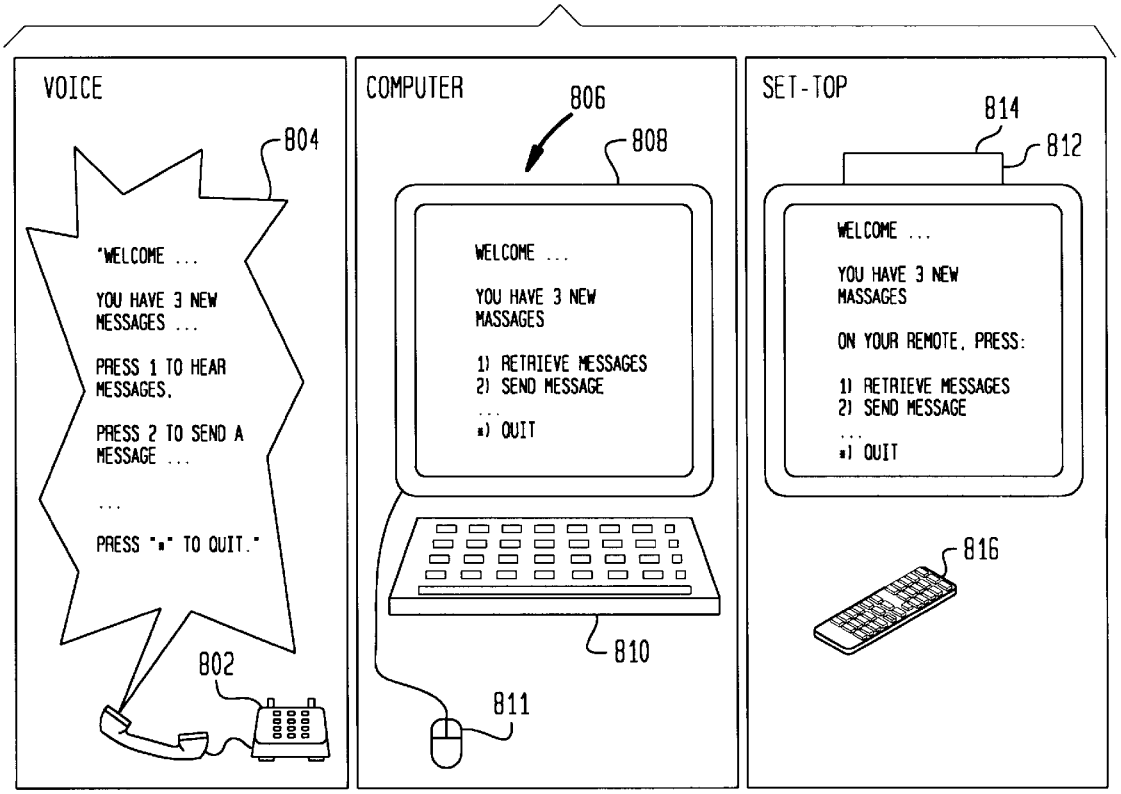

MESSAGING ARCHITECTURE SUPPORTING DIGITAL AND ANALOG MEDIA

BACKGROUND OF THE INVENTION

1. Field of the Invention

The present invention relates to communications systems and, more particularly, to a data messaging architecture which supports the upload and download of both analog and digital media from the same communications network entry point from different communications devices.

2. Discussion of Related Art

Telephone voice message services record and store voice messages directed to voice messaging customers. These messages are often converted from analog to digital information. The digitized messages may be saved, retrieved, forwarded, or otherwise treated in the same manner as other digital data. A typical voice messaging system saves digitized voice information in a format similar to that used for storing computer data. While convenient, voice messaging systems may only receive voice information, it cannot receive fax, data, or other types of information. FIG. 1A illustrates a typical voice messaging system 100. A communications network 102, such as a Public Switched Telephone Network (PSTN) or Integrated Signaling Digital Network (ISDN), connects a number of telephones 104, 106. A voice messaging system 108 is part of the communications network 102 (or is a peripheral device to the network).

If the user of a first telephone 104 is a voice messaging subscriber, the user may access the voice messaging system 108 by calling a predetermined telephone number and, for example, providing a personal identification number (PIN) via DTMF (Dual Tone Multiple Frequency) tones by pressing buttons on a Touch-Tone telephone. Once the user has gained access to the system, the system may play prerecorded (or speech synthesized) messages which prompt the user through a menu of choices. The user may respond, for example, using DTMF tones, or speaking into the telephone, if the system has speech recognition capability. The menu may tell the user how many messages have been received, allow the user to retrieve messages, allow the user to record an outgoing message, forward messages to others, etc.

If the user of a second telephone 106 is not a voice messaging subscriber, the user may be provided only limited access to the system 108. For example, if the user calls a voice messaging subscriber and the call is forwarded to the system 108, the user may be permitted only to leave a message for the subscriber.

Facsimile (fax) messaging systems are proposed. For example, Octel has proposed a fax messaging system which allows faxes to be recorded and retrieved, forwarded, accessed by one or more recipients, or otherwise handled. FIG. 1B illustrates a proposed fax messaging system 150. A communications network 152, such as a PSTN or ISDN connects a number of fax machines 154, 156. A fax messaging system 158 is part of the communications network 152 (or is a peripheral device to the network).

If the user of a first fax machine 154 is a fax messaging subscriber, the fax machine may access the fax messaging system 150 by calling a predetermined telephone number and, for example, providing a PIN by pressing buttons on a Touch-Tone telephone. Once the fax machine has gained access to the system, the system may provide the fax machine with faxes addressed to the fax machine 154 or receive a fax from the fax machine 154. Other options may also be available, such as forwarding faxes, establishing fax distribution lists, and permitting several recipients to obtain the same fax from the system 158. While also convenient, the proposed fax messaging system may only send and receive fax data.

Moreover, for a service provider, such as a local or long distance telephone service provider, to provide both voice and fax messaging systems, two complete systems having two network communications entry points is necessary. The two systems will also have two separate user navigation schemes. FIG. 2 illustrates a communications system 200 having separate voice and fax messaging systems. A communications network 202 connects several telephones 204, 206 to a voice messaging system 208 and several fax machines 254, 256 to a fax messaging system 258. Note that two complete systems 208, 258 are provided. Each system has its own entry point (i.e., each is accessed by dialing a different number). Each system has a separate menu and user prompts. (The fax messaging system may have few or no prompts because a fax machine is a "dumb" device. A "dumb" device is one in which messages are sent and retrieved by predetermined codes that are not manipulated by the user.) Also, other types of data (moving and still video, computer data, etc.) cannot be handled by either system. Because an increasing amount of telephone line traffic is data rather than voice, it would be convenient for telephone network customers to be able to "leave" data messages in the same way that voice messages may be left.

The ability to "leave" data messages for others has many benefits. For example, some computer software providers remotely update their products. That is, software updates are performed over telephone lines via modems. To perform these upgrades, the software provider contacts each individual customer, connect the software provider's computer to the customer's computer and downloads the upgraded software. These upgrades may take several hours to complete. Thus, the total time for a software provider to upgrade all of its clients is n*t, where n is the total number of clients to be upgraded and t is the total time to perform a single upgrade.

Remote upgrades have a second drawback. Whenever two computers communicate via modem, computer hackers have an opportunity to obtain access to the communicating computers. Thus, the direct communication between the customer's and the software provider's computers is an opportunity for a hacker to access one or both of these computers. These upgrades would be more secure if they did not involve a direct communication between computers.

Therefore, it is an object of the present invention to provide a data messaging system which handles analog and digital data, including voice, fax, computer data, and video information.

It is another object of the present invention to provide a messaging architecture which can receive messages of different formats at a single network entry point.

It is a further object of the present invention to provide a manner in which computers or other communications devices may indirectly communicate.

It is yet another object of the present invention to provide a voice and data messaging system operable with different types of calling devices without modifying the calling devices.

It is yet a further object of the present invention to provide a modular data messaging system which can be supplemented to handle different communications format without significant modifications to the overall system.

SUMMARY OF THE INVENTION

These and other objects of the present invention are provided by a messaging system which stores voice or data messages and which allows such messages to be retrieved at the convenience of the recipient. A preferred data messaging system architecture according to the present invention includes a network device (which may be located in a single location or distributed throughout the communications network) having a digital signal processor at a communications entry point, an operational application program interface (API), a number of calling device personality and rules sets, a storage input/output, and voice and data message storage.

The digital signal processor determines the type of communications device issuing a request to the system. The operational API provides a user interface to the calling device according to a predetermined set of operating rules. These rules specify the calling device's ability to navigate through a messaging path and provide capability which may be required for the calling device type. The calling device personality and rules set modules preferably contain a feature set for the particular type of communications device. Each personality and rules set module preferably contains all the resources needed for navigation and operations, such as storing, retrieving, and converting to and from other types of formats. The storage input/output provides an interface between the personality and rules set module and the voice and data message storage. The voice and data message storage maintains the messages and other information.

Once the data messaging system determines the communication format of the communications device, the system preferably requests a userid and a password. A user having a secondary userid and password may be provided with limited access to certain messages stored on the system. A user having no userid or password may only be permitted to leave messages for other users.

Depending on the userid and password, different menus are displayed. A user having access to leave and receive messages is provided with more options than users who may only leave messages.

Preferably, the system should be able to handle several calls simultaneously. This allows many users to retrieve the same message simultaneously.

BRIEF DESCRIPTION OF THE DRAWINGS

The present invention is described with reference to the following figures.

FIG. 4 is a block diagram of a preferred embodiment of a data messaging system according to the present invention;

FIG. 8 illustrates a portion of a customer menu as provided by three different communication devices.

DETAILED DESCRIPTION OF PREFERRED EMBODIMENTS

The present invention is a messaging system which may store voice or data messages and allow such messages to be retrieved at the convenience of the recipient.

Overview of the Invention

Figure 1A:
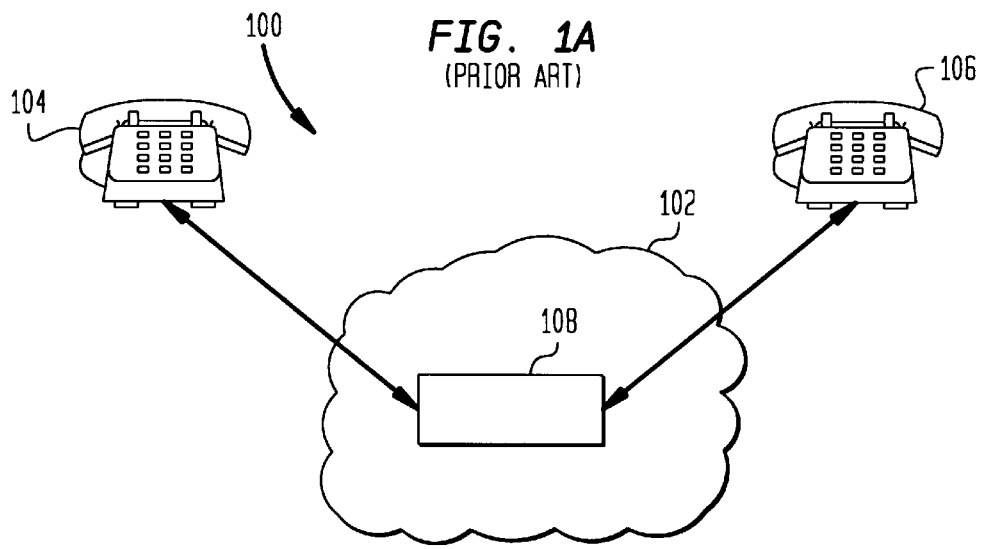
FIG. 1A illustrates a conventional voice messaging system.
Figure 1B:
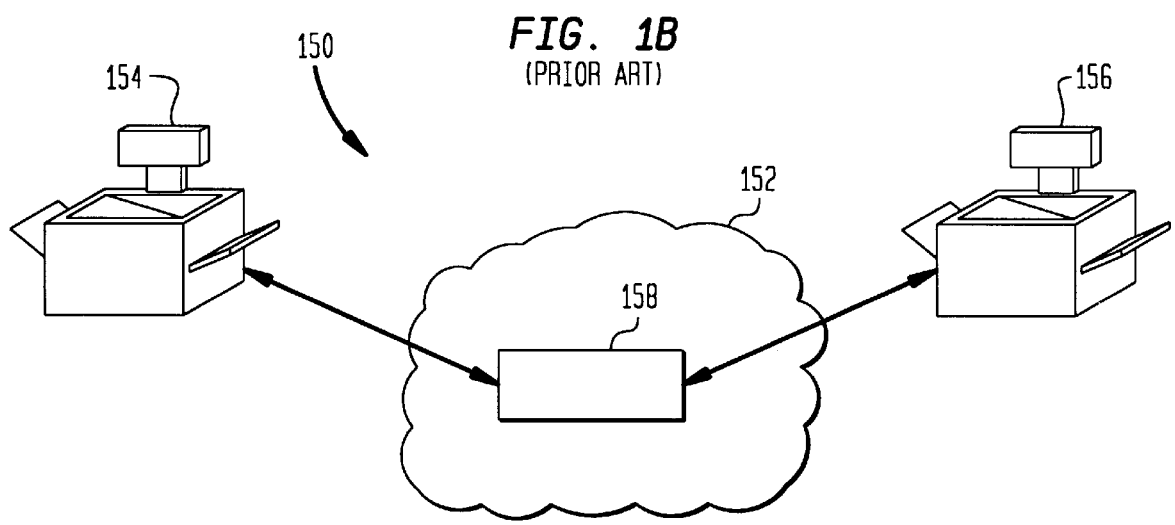
FIG. 1B illustrates a fax messaging system.
Figure 2:
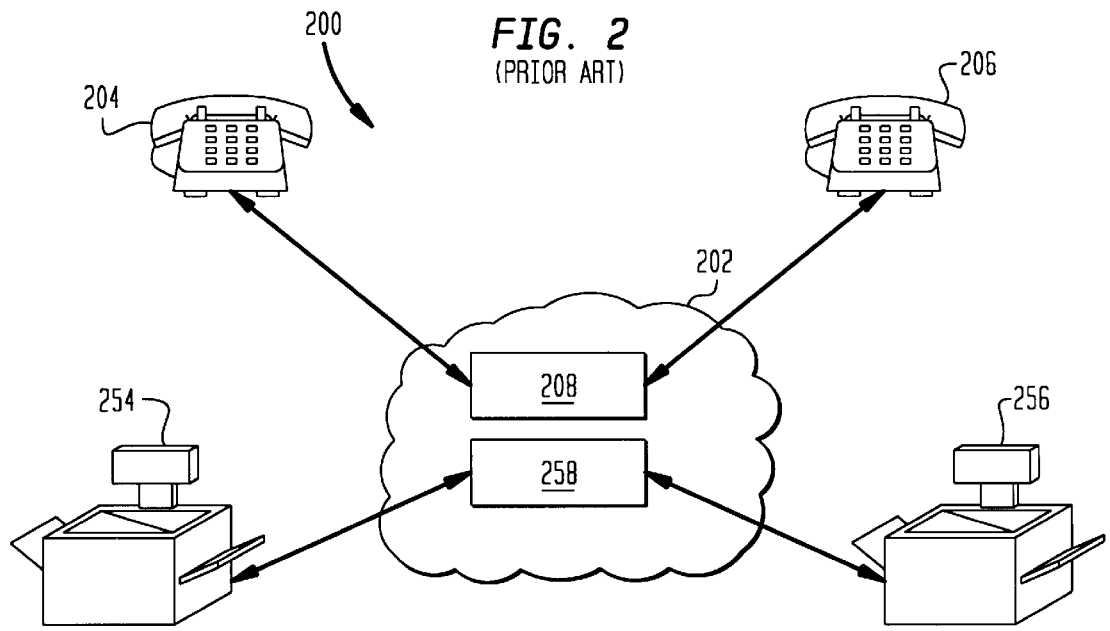
FIG. 2 illustrates a communications system having both a voice messaging system and a fax messaging system.
Figure 3:
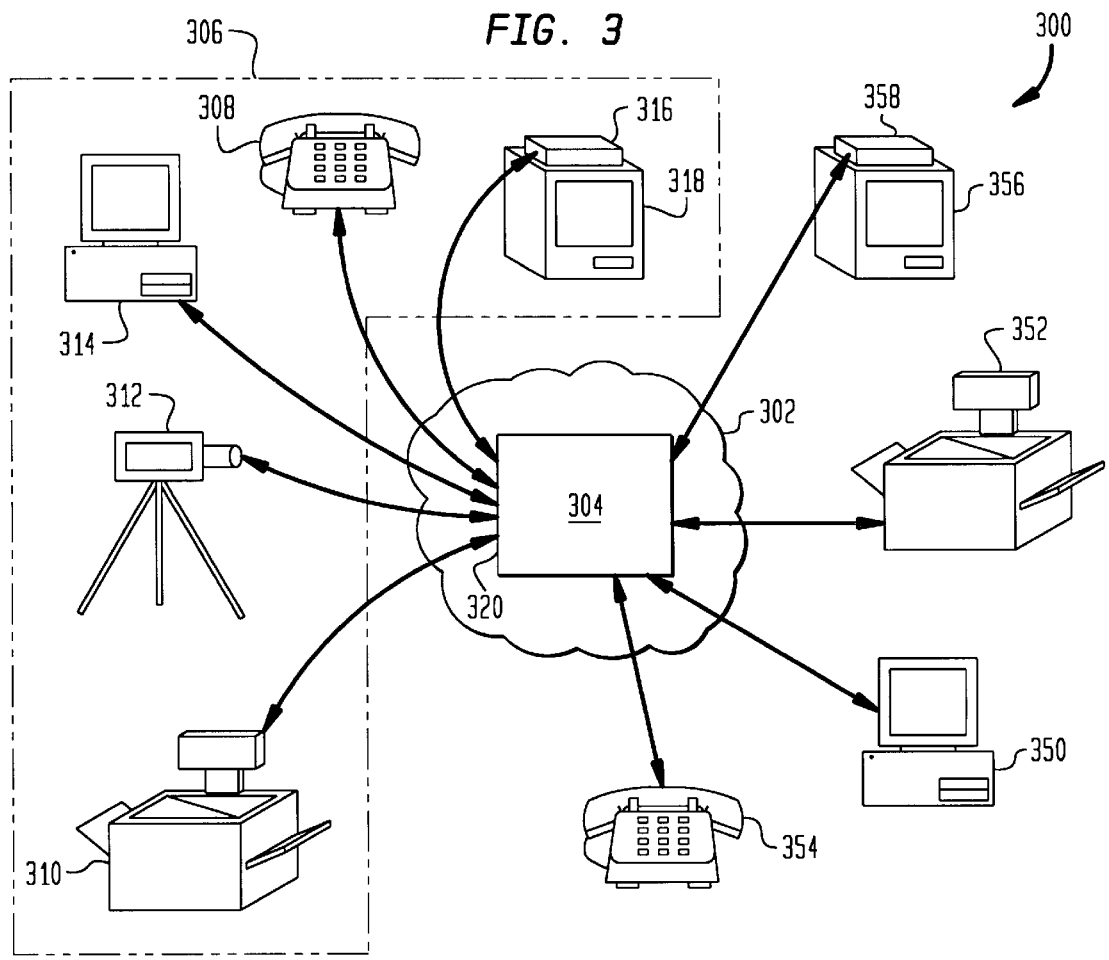
FIG. 3 illustrates a data messaging system according to a first preferred embodiment of the present invention.

FIG. 3 is a block diagram of a communications system 300 having a messaging architecture according to a preferred embodiment of the present invention. A communications network 302, such as a PSTN, ISDN, the Internet, a Wide Area Network (WAN), or other network includes a data messaging system 304 according to the present invention. The data messaging system 304 may be connected to the communications network as a network element or peripheral. The data messaging system 304 may be connected to several communications networks. For example, the data messaging system 304 may be connected to PSTN and ISDN networks to provide narrow and broadband communications, respectively.

A data messaging subscriber 306, such as a business office, may have a number of communications devices which may obtain access to the system 304. For example, the subscriber may connect to the system 304 a telephone 308, a fax machine 310, a video camera 312, such as a digital video camera, a computer 314, or a set top box 316 connected to a television or monitor 318. Preferably each of these devices accesses the system at a single entry point 320, e.g., each device accesses the system at the same telephone number, Internet address, etc. Each device contacts the system 304 via a connection compatible with the device. That is, a telephone may use a PSTN line, and a digital video camera or set top box may use an ISDN or other broadband line.

Other subscribers or non-subscribers may also leave messages on or retrieve messages from the system 304, according to the permitted access. Typically, all subscribers and nonsubscribers may leave a message on the system for one or more subscribers. Non-subscribers may be provided limited access by subscribers to retrieve messages from the system.

The system may operate in the following manner. A sending party desires to send a message to a recipient party. This "message" may be a voice message, a fax, a data message (such as e-mail), a digital photograph, a digital video presentation (such as MPEG video), or other analog or digital information. The sending party may issue a request to the recipient (e.g., call a telephone or fax number, send an e-mail to an Internet address, etc.), and the request is forwarded to the system 304. The system determines the format of the request being sent, determines the request is to leave a message, and the desired recipient. The message is stored on the system 304 until the recipient retrieves or otherwise disposes of the message.

A sending party may wish to send a message from, for example, a computer 350, fax machine 352, telephone 354, or video camera or monitor 356 via a set-top box 358. Assume that the sender wishes to send an e-mail from a computer 350 to a recipient party. The sender composes the e-mail and sends it to the appropriate address. This may be done, for example, by the sender addressing the e-mail to an address for the system, or by a subscriber-defined routing or screening preference at the subscriber's e-mail address. The e-mail is stored in the system 304. The e-mail may be stored in e-mail format or, alternatively, may be converted into a format preselected by the recipient as a preferred format before storing.

When the recipient accesses the system 304, he issues a request to the system, the system determines the format of the request, and determines the request is to retrieve messages. The user is notified that a message has been received. The message described above, for example, may be retrieved in e-mail format (or the format in which it was stored, if different) and viewed on a computer 314 or printed out. Alternatively, at the subscriber's request, the system may perform format translation of the stored message and permit the recipient to view the message in any desired format. For example, if the recipient used a telephone 308 to access the system, the message may be converted into synthesized speech and "read" to the recipient. Alternatively, the recipient may wish to receive the message as a fax. Thus, the message is translated into a facsimile format and sent to a fax machine 310. As another alternative, the recipient may wish to see the message displayed on a television monitor 318 via a set top box 316. Note that because the calling device is connected to the system via a line having adequate bandwidth to service that device, the converted message may be transmitted over the lines to the device, regardless of the original format.

As another example, a computer software provider remotely upgrading a program may connect a computer 314 to the system 304 and download the software upgrade to the system 304. The software provider's customers may be data messaging subscribers or non-subscribers with limited access to the system as secondary users. In any event, the customer may connect its computer 350 to the system 304 and obtain the upgrade at any time at its convenience.

This has several advantages. First, the software provider saves substantial time in performing the upgrade. If the time to perform individually its customer's software upgrades is n*t (where n is the number of computers having programs to be upgraded and t is the time to perform a single upgrade), the time saved is ((n−1)*t). This is because the software upgrade is only downloaded once. This is also convenient for the customer because the upgrade (which may take several hours) may be performed at the customer's convenience; preferably when the computer receiving the upgrade is not needed for other tasks. Another advantage is that the software provider's computer and the customer's computer do not directly communicate. This "off-line", or asynchronous, communication reduces the likelihood of a hacker gaining access to either of the computers involved in the upgrade.

In yet another example, a video-on-demand service may be supported. A video supplier may upload an entire video performance onto the system. A viewer (such as subscribers or non-subscribers having a secondary userid) may be able to view the video performance by downloading it at the viewer's convenience.

The system 304 may be used as an e-mail system. For example, a subscriber may provide certain parties limited access to the system by providing secondary userids. A customer may leave a message on the system with instructions for the system to provide the message to a secondary user when that user signs on. The user may return e-mail by leaving e-mail to the subscriber in the usual manner.

FIG. 4 illustrates a block diagram of a data messaging system 304 according to a preferred embodiment of the present invention. The data messaging system 304 includes a digital signal processor (DSP) 404 at a communications entry point 320, an operational API 406, a number of calling device personality and rules sets (e.g., format information) 408A–408N, at least one calling device personality and rules set for each communication device type the data messaging system handles, an input/output 410, and voice and data message storage 412.

The I/O subset provides low-level capabilities to actually store, identify, and retrieve messages from the system's storage 412. Storage devices currently used by voice-messaging systems are limited to magnetic tape platters. But, for video-on-demand, for example, the storage device may be a laserdisc system or other large scale DASD device. Preferably, the storage device may store any type of digital data: text, video, fax, etc.

The operational API 406 is preferably contained entirely in the data messaging system 304 and is configured to interface with replaceable, loadable personality and rules sets (PARS) modules 408A–408N. Each PARS module preferably contains a feature set for a particular type of communications device. The PARS module preferably contains all the resources needed for navigation and operations such as storing, retrieving, and converting from other types of messages into a message for this communications device type (such conversions are well known and not described here). The operational API 406 interacts with the calling device through a set of operating rules, regardless of device type. These rules—some generic as well as some specific to a certain calling device type—specify the calling device's abilities to navigate through the messaging path, as well as provide additional capabilities which may be specially required for that device type. Additionally, PARS may be added to the system without making significant modifications to the API.

To exemplify this modular concept, first consider the capability of the data messaging system to provide a message retrieval menu to various calling devices. From a user perspective, using this system as a voice-messaging service provides the standard audio response unit. When a computer is used to connect to the same service, ANSI-compatible (or TTY) characters are sent. Accordingly, a similar menu is sent to set-tops using available high-bandwidth mechanisms. Note that since fax machines are essentially dumb terminals, no navigational menus are presented to the user—faxes are automatically sent or received depending on the fax machine's configuration. Note that in a preferred embodiment, only a single API is used regardless of the number of PARS in the system. Preferably, only minor (if any) adjustments are made to the API 406 to accommodate a new PARS. The operational API 406 preferably calls the same functions or function packets to create the menus described below. The actual output is solely a function of the implementation of these functions in the personality module loaded for the calling device. In the object-oriented programming domain, this is known as "function overloading". This function overloading technique gives data messaging enormous flexibility.

Detecting the Communication Type

The first step towards using the data messaging architecture described in the Overview is to issue a request to the system. The system may be called by dialing a telephone number, entering an Internet address, etc. When the system responds, it determines the communication format (e.g., computer via modem, telephone, fax, etc.) of the request.

The DSP 404 determines the calling type. If the DSP 404 detects no digital signal at the entry point 320, a voice call is assumed and the request is connected to the voice personality and rules set 408A. The DSP 404 is preferably programmed to detect the unique tones (i.e., frequencies) which identify a computer modem, a fax machine, or other communications device. When the DSP 404 determines the type of communications device is calling the system 304, the request is routed to the appropriate personality and rules set. A preferred DSP is the FX 125A-R4 available from Black Box, Inc. The operational API 406 functions like distributed network communications by preparing packets containing generic commands and data for the personality and rules set modules 408 to act on. By using a packet-based system, such as ATM, multiple calling devices may be operated on simultaneously.

Once the communications device type is determined, the log on procedure described below is performed.

Accessing the System

Figure 5:
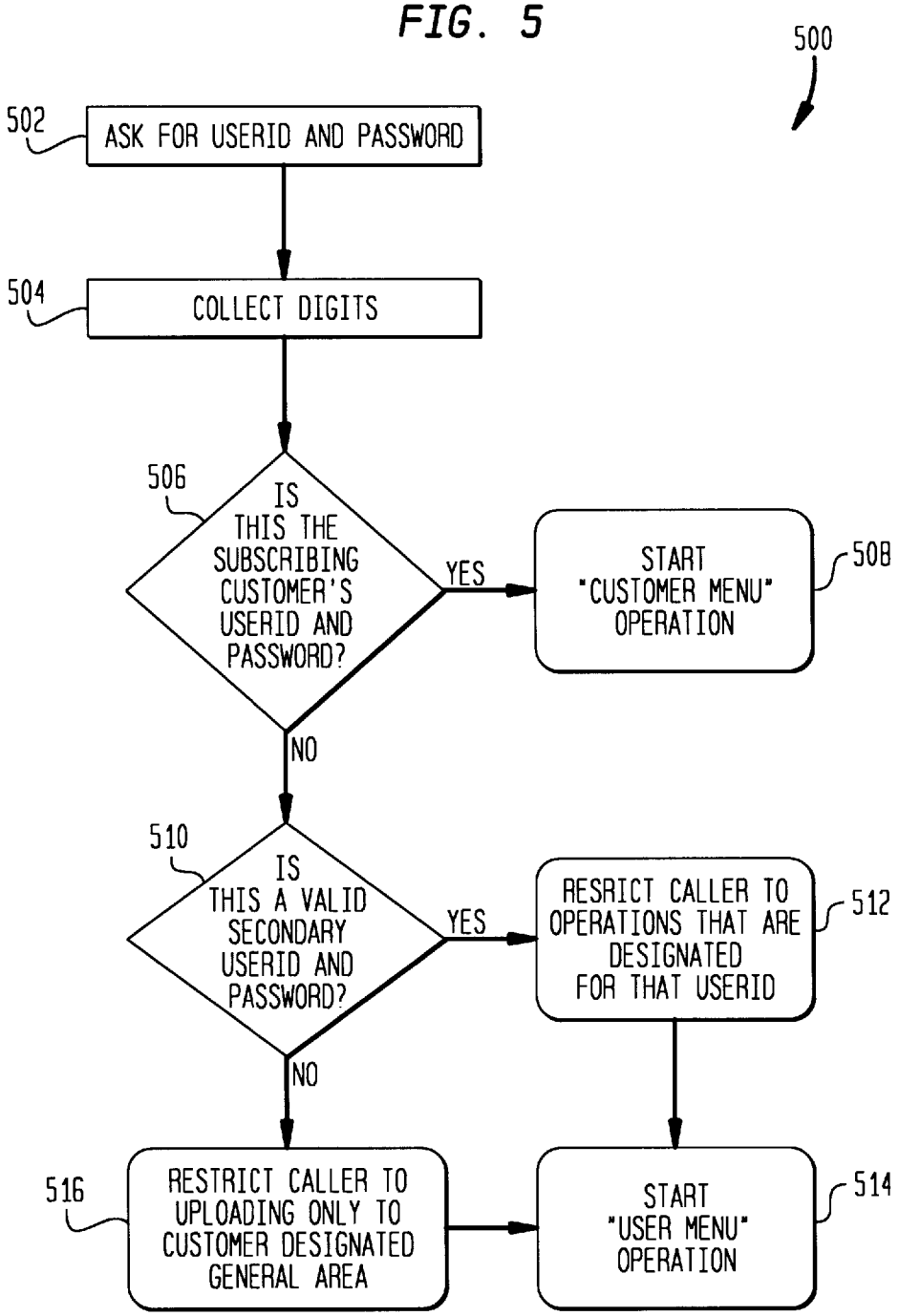
FIG. 5 is a flow chart of a preferred accessing method for the invention.

FIG. 5 is a flow chart of a preferred accessing method 500 for the system 304. Once the system has determined the communications format and connects the appropriate PARS, the system preferably requests a userid and a password (step 502). This may be done in any format. For example, a telephone call may receive a prerecorded speech synthesized message or a computer may receive a text message via a modem. The system then collects digits input by the user (step 504). The digits may be provided by DTMF tones, typing onto a computer keyboard, speaking into a telephone if the system has speech recognition capability, etc.

The system 304 determines if the collected digits, representing the user's userid and password, are a subscriber's userid and password (step 506). If so, the system 304 starts a "customer menu" option (step 508). If not, the system determines if the collected digits are a secondary user's userid and password (step 510). A secondary user is a user having limited access to messages stored on the system. For example, a software provider customer may be provided with secondary access to the system in order to download a software upgrade. If the userid and password are for a secondary user, the user is provided restricted access according to the userid (step 512). For example, a secondary user may be provided access only to a single software upgrade of several available for the software provider. The system 304 starts a "user menu" option (step 514).

If the user provides no userid or password, the user is restricted to uploading messages, i.e., leaving messages for subscribers (step 516). The system 304 starts the "user menu" option (step 514).

Because a fax machine is a "dumb" device, preferably no log on procedure is performed. Rather, when a fax signal is detected by the DSP 404, the system may be programmed to automatically connect to the fax personality and rules set 408C. The fax PARS may be configured to receive fax data. A data messaging subscriber may, for example, be able to (1) retrieve received faxes on other calling devices by converting the fax text into another format; (2) have the system deliver the fax to the subscriber's fax machine (or any other fax machine designated by the subscriber); (3) put a "camp" on a recipient's fax number and send a fax to a recipient when the number is available, or (4) send the fax at a predetermined time.

The "customer menu" and "user menu" are described below.

The Menus

The menu the system displays to the user preferably depends primarily on the userid and password provided during the access stage. If the userid and password indicate that the user is a subscriber, the menu provides several options.

Figure 6:
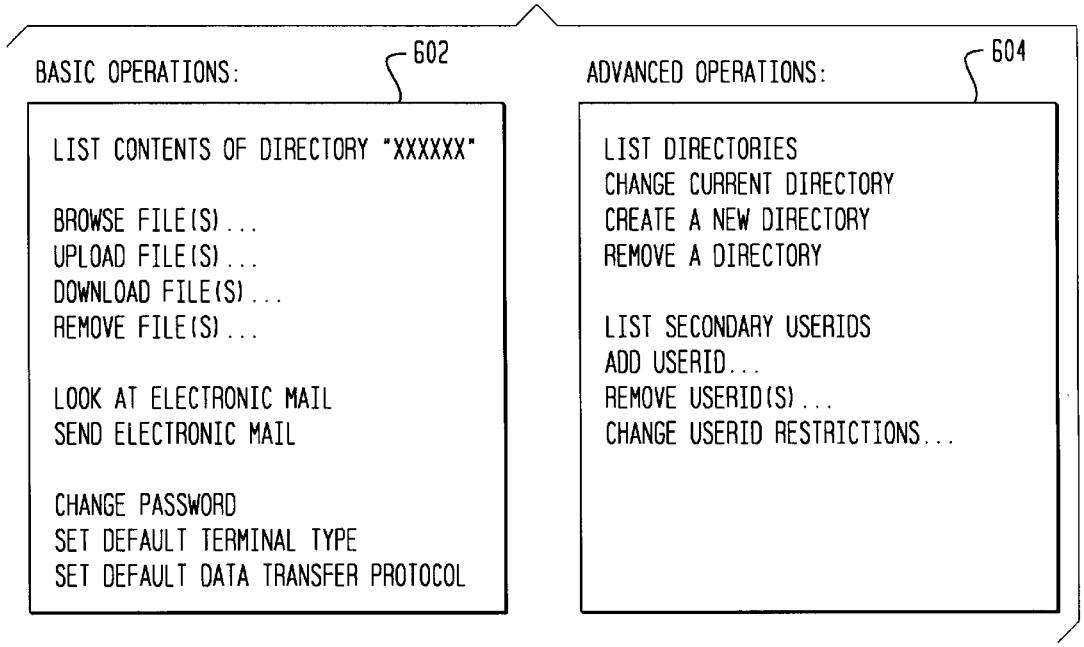
FIG. 6 is a first illustrative customer menu which may be provided by a preferred embodiment of the present invention.

FIG. 6 is an illustrative customer menu 600, including some options which may be available in a preferred embodiment of the invention. FIG. 6 illustrates that basic operations 602 and advanced operations 604 may be provided. Basic operations 602 which may be selected by the customer include: a list of directory contents (such as all outgoing messages, received messages, etc.); browse, upload, download, or remove files; look at or send e-mail; and change password, default terminal type, or data transfer protocol. Advanced options 604 which may be selected by the customer include: list directories, change current directory, create a new directory, and delete a directory; list secondary users, add userids for secondary users, delete userids for secondary user, and change userid restrictions.

Figure 7:
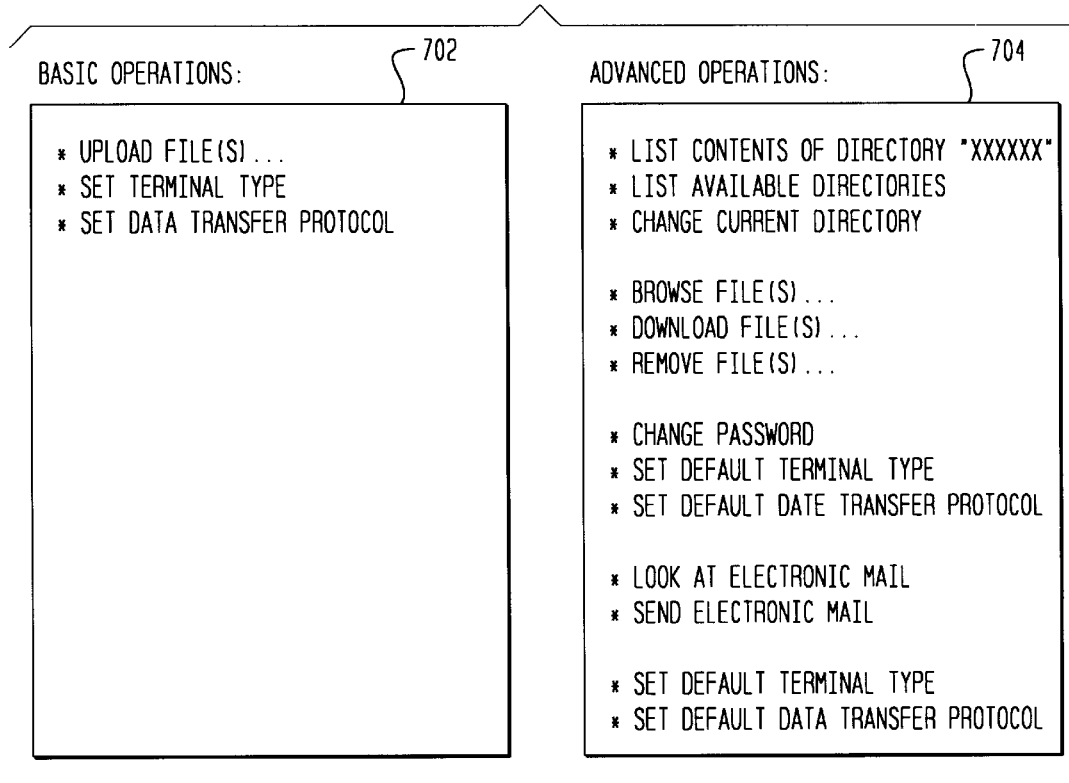
FIG. 7 is a second illustrative customer menu which may be provided by a preferred embodiment of the present invention.

FIG. 7 is an illustrative user menu 700, including some options which may be available in a preferred embodiment of the invention. FIG. 7 illustrates basic operations 702 and advanced operations 704 which may be provided. Preferably, the basic operations may be made available for all users and the advanced options may be made available only for users having a secondary userid. Basic operations 702 which may be selected by the customer include: upload a message (leave a message); set terminal type, or set data transfer protocol. Advanced options 704 which may be selected by the customer include: list contents of a directory, list directories made available to the secondary user (as determined by the subscriber), change current directory; browse, download, or remove files; look at or send e-mail; and set terminal type or data transfer protocol.

The operations described above are conventional database operations which are fully understood by a person skilled in the relevant art. Therefore, these operations are not described in further detail.

Each menu has a single user navigation scheme, preferably provided by the operational API 406, regardless of the communications device (except perhaps for faxes, as described above). When the system 304 determines the communications device type, as described above, the appropriate PARS 408 is selected and communication is provided in the appropriate format.

FIG. 8 illustrates a portion of a customer menu as provided by three different communications devices. A telephone 802 may receive a prerecorded or speech synthesized message 804. Responses may be entered through DTMF tones or spoken commands. The same message may be received by a computer 806 and displayed on a computer screen 808. Responses may be entered on the computer using an input device such as a keyboard 810 or mouse 811. The same message may be received by a television or monitor 812 via a set top box 814. Responses may be entered using, for example, a remote control device 816, such as an infrared remote control.

Leaving a Message

Preferably, any user may leave a message. A non-subscriber may, for example, leave a message for a subscriber. The desired subscriber may be selected in a number of ways. For example, the telephone number dialed or Internet (or other) address used to deliver the request to the system may indicate the desired recipient. Alternatively, the user may select from a choice of recipients or provide the system with an id for the desired recipient.

Referring again to FIG. 4, a message may preferably be left in the following manner. A calling device 450, such as a telephone, a fax machine, a computer, etc., issues a request to the system 304. This may be done by dialing a predetermined telephone number or by having the request forwarded to the system by a routing preference of the intended recipient. The request is directed to an entry point 320. Preferably, the entry point is the same regardless of the communications device used to issue the request.

When the request arrives at the entry point, the DSP 404 determines the format of the received signal according to the frequency (tone) of the incoming signal. When the DSP 404 determines the communication format, it selects an appropriate PARS 408 corresponding to the signal format. The operational API 406, via the PARS, determines the user's access level using, for example, the access method described with reference to FIG. 5. After the access level is determined, the operational API 406, via the PARS, presents the appropriate menu to the user, such as the menus described above with reference to FIGS. 6 and 7. The user selects from the menu the option to leave (upload) a message.

The message is delivered from the calling device 450 and enters the system 304 at the entry point 320. The message is processed by the PARS 408 and sent to the I/O 410. The I/O forwards the processed message to the voice and data message storage 412. Some messages, such as still or moving video, may be compressed before storing. Preferably, all messages are stored in the same storage medium.

The message is stored in digital format. Analog voice messages are converted into digital information using standard analog-to-digital conversion. The voice PARS 408A may have, for example, an analog-to-digital converter for converting the analog voice message into a digital message suitable for storage on the voice and data messages storage 412. Note that format conversion may be performed when the message is received or when the message is uploaded. For example, a subscriber may have a preference to receive messages in e-mail format. The data messaging system may receive a message for the subscriber in any format for which a PARS is present. When the system determines that the message is for a particular subscriber, the subscriber's preferences (which may be stored, for example, in the voice and data message store 412) may be determined and the message may be converted into a preferred format. Alternatively, the message may be stored in the original format and be converted if necessary during upload in a manner described below.

If the message to be stored is determined to be data, and not voice, more menu selections may be provided than for voice messaging. For example, a user may specify a terminal emulation, select an upload/download protocol, or other communications choice.

A user may be able to leave e-mail for the subscriber by using any of a number of commercially available simple text editing tools to compose an e-mail message (preferably off-line). The message may then be sent to the data messaging system.

Each stored message preferably includes "message content" and "message resources". Message content is the digitized information representing the message. This may be a computer file. Message resources is digital information associated with the message. This information may include the type of source device, caller identification, message personality, message title, message size, date and time of receipt, etc. Message resources may be stored in the same or a different location as the message content.

The voice and data messages storage 412 is preferably arranged in the following manner. All messages are preferably maintained in a single file system which specifies: "DATA NAME" identifying the message, "DATE RECEIVED", "OWNER" (i.e., Call ID or Login ID), "DIRECTORY", and "DATA TYPE" or "VOICE". Hidden rules may be maintained for lists of Login IDs, secondary user restrictions, login history, etc.

On a MacIntosh platform, for example, message resources may be hidden files linked with the content file. On an OS/2 platform, message resources may be extended attributes stored in a single repository. Preferably, data files may be distinguished from voice files. This may be done, for example, by adding a parameter to the message resources field of the message. Also, a subscriber may define a number of directories for storing different groups of data. A subscriber may, for example, create a directory for storing software upgrades for a first software product, and a second directory for storing an entire second software package.

Retrieving a Message

Preferably, access to retrieve a message is limited to subscribers and to users having a secondary userid, such as a subscriber's customer. Referring again to FIG. 4, a message may preferably be retrieved in the following manner. A calling device 450, such as a telephone, a fax machine, a computer, etc., issues a request to the system 304. This may be done, for example, by dialing a predetermined telephone number or Internet address. Regardless of the communications device type, the request is preferably directed to a single entry point 320.

When the request arrives at the entry point, the DSP 404 determines the format of the received signal according to the frequency (tone) of the incoming signal. When the DSP 404 determines the communication format, it selects an appropriate PARS 408 corresponding to the signal format. The operational API 406, via the PARS, determines the user's access level using, for example, the access method described with reference to FIG. 5. After the access level is determined, the operational API 406, via the PARS, presents the appropriate menu to the user, such as the menus described above with reference to FIGS. 6 and 7. The user selects from the menu the option to retrieve (download) a message. The voice PARS 408A may have, for example, a digital-to-analog converter for converting the stored digitized message into an analog message suitable for transmitting to a conventional telephone.

The user identifies the message or messages to be retrieved. This may be done in any number of ways, such as in the manner that messages are selected using conventional voice messaging systems. For example, when a subscriber accesses the system, the menu may indicate how many new messages the subscriber received. Alternatively, the user may select a directory from which a message may be retrieved. A list of files in the selected directory may be provided for the user to select.

Once selected, the message may be retrieved from the voice and data messages storage 412, sent to the I/O 410, converted into the appropriate format by a PARS 408, and delivered to the calling device 450. Note that the PARS may be used to convert digital data uploaded in one format into a second format for downloading. For example, if a subscriber desires to retrieve a message using a computer, the computer PARS 408B interfaces with the subscriber. When the subscriber retrieves a stored message, the message may be sent from the voice and data message storage 412 to the PARS 408B via the I/O 410 in its original format, which may or may not be in computer text format. The PARS 408B converts the message (if necessary) from the original format into text format to upload to the subscriber's computer. For example, a fax message can be retrieved as a bitmap file for computers or as a high bandwidth still-image for viewing on a monitor connected to a set top box. This may be done in any number of format conversion methods known to those skilled in the art.

Other Features

Figure 9:
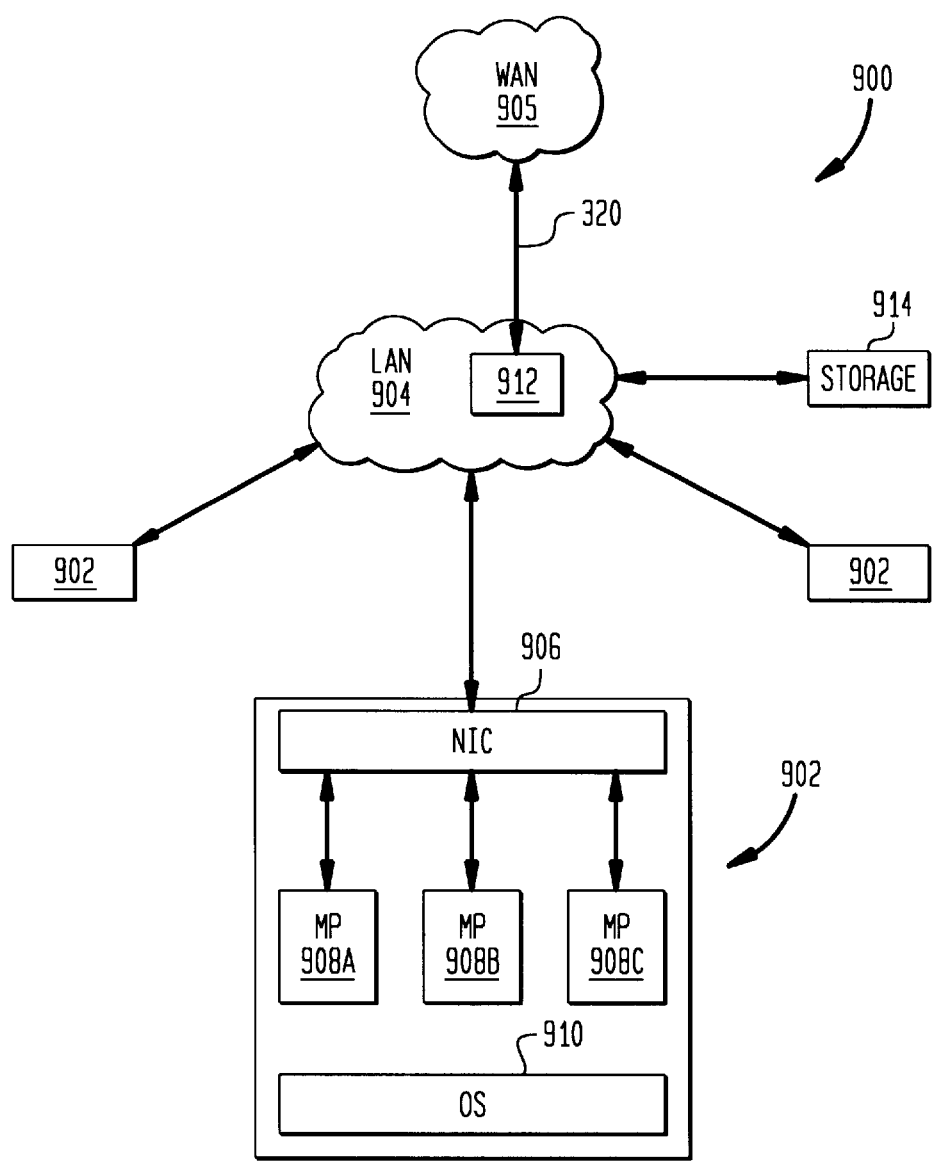
FIG. 9 is a block diagram of a preferred configuration of a data messaging system according to the present invention.

Preferably, the system should be able to handle several calls simultaneously. This may be achieved in a number of ways well known to those skilled in the, art. One configuration 900 capable of simultaneously handling several calls is illustrated in FIG. 9. A data messaging system preferably includes one or more computers or workstations 902 connected to a Local Area Network 904 (LAN). The LAN 904 is connected to a wide area network (WAN) 905 via a single entry point 320. Each workstation may have a network interface card (NIC) 906 adapted to handle multiple calls simultaneously. One such network interface card is a TCP/IP or Ethernet card such as the 3Com 100 Mbit NIC. Each workstation is preferably equipped with multiple processors 908A, 908B, 908C for parallel computing. Preferably, each workstation should be running on an operating system 910 capable of true non-preemptive multitasking such as UNIX or OS/2 or WINDOWS NT. Preferably, the system includes a front-end switching system 912 which routes calls to workstations having the least load in a manner similar to Northern Telecom's DMS-200. Messages may be stored in a storage device 914, which may be, for example, a disk array or other magnetic storage device.

The subscriber may be able to activate or lockout data messaging for security. Preferably, this may be done with a text command (using a computer and modem) or DTMF command (using a Touch Tone telephone).

Conclusion

A messaging architecture supporting digital and analog media is described. The architecture has several advantages. These advantages include:

Single entry point: a single entry point is provided for the system regardless of the communication device type.

No modifications to calling devices: preferably, no modifications or software are required for the calling devices.

Single system: a single system is provided.

Versatility: any calling device may be used to contact the system, and to upload or download messages.

Security: data messaging provides a safe middle ground to prevent hackers from directly accessing a computer system.

Control: archived data provides a subscriber with the opportunity to screen which files it wishes to retrieve, save, delete, or forward at any time.

Accessibility: data messaging avoids delays or loss of data because a data connection is busy or not answering. For example, faxes may be sent without receiving a busy signal.

Simultaneous Access: a number of communication devices may download the same message at the same time.

Reduced Operating Costs: the cost of performing software upgrades, for example, are lowered because the on-line time of the uploading communication device is reduced to the time for a single upload.

Modularity: a personality and rules set may be added to the system to accommodate new communications technologies.

Storage: a single storage medium may be used to share all data formats.

The above described embodiments of the invention are intended to be illustrative only. Numerous alternative embodiments may be devised by those skilled in the art without departing from the spirit and scope of the following claims. For example, the inventive data messaging system may be applied to almost any hardware and software platform. Although the architecture itself is described herein as object-oriented and multitasking, conventional programming methods can be used to emulate both the object-oriented function overloading techniques as well as multitasking (or timeslicing). In fact, the packet-based nature of the operational API allows easy development under systems which cannot handle multiple contexts.

I claim:

1. A messaging architecture for use in a communications network, comprising;
   a. an entry point configured to receive a message from the communications network;
   b. a plurality of personality and rules sets configured to process conmunications in a number of formats;
   c. a digital signal processor connected to the entry point and configured to determine a format of a message received at the entry point and configured to select one of the personality and rules sets according to the determined format, wherein the digital signal processor is further configured to determine a communications device type issuing the received message by:
      (1) detecting one of a presence and an absence of a digital signal;
      (2) if no digital signal is detected, determining that the message is a voice message;
      (3) if a digital signal is detected, determining a frequency of the received signal; and
      (4) determining the communications device type from the determined frequency; and
   d. a storage device configured to be responsive to the personality and rules sets.

2. The messaging architecture of claim 1, further including an operational application program interface (API) connected to the plurality of personality and rules sets.

3. The message architecture of claim 2, wherein the operational API is a single operational API connected to each of the plurality of personality and rules sets.

4. The messaging architecture of claim 1, farther including an input/output connected between the plurality of personality and rules sets and the storage device.

5. The messaging architecture of claim 1, wherein the entry point is further configured to receive voice messages, one personality and rules set is configured to handle voice messages and to convert voice messages into a digital signal, and the digital signal processor is configured to determine if a voice message is received at the entry point.

6. A messaging architecture for use in a communications network connected to a local area network (LAN), comprising:
   a. an entry point configured to transmit and receive messages between the communications network and the LAN;
   b. a number of workstations connected to the LAN, each workstation having:

(1) a network interface card (NIC) configured to transmit and receive messages between the LAN and at least one of the number of workstations;
(2) a processor connected to the NIC and configured to process received messages and having:
   (a) a plurality of personality and rules sets configured to process messages in a number of formats; and
   (b) a digital signal processor in communication with the entry point and configured to:
      i. determine a format of a message received at the entry point by:
         (A) detecting one of a presence and an absence of a digital signal;
         (B) if no digital signal is detected, determining that the message is a voice message;
         (C) if a digital signal is detected, determining a frequency of the received signal; and
         (D) determining the communications device type from the determined frequency; and
      ii. configured to select one of the personality and rules sets according to the determined format;
(3) a multitasking operating system in communication with the processor; and
c. a storage device connected to the LAN and configured to store messages.

7. The messaging architecture of claim 6, wherein each workstation includes a plurality of processors.

8. The messaging architecture of claim 6, wherein the LAN further comprises a front end switch configured to route incoming messages to wor load.

9. A method for providing data messaging in a communications network, comprising the steps of:
   a. receiving a request from a communications device at an entry point:
   b. determining the communications device type issuing the receipted request by:
      (1) detecting one of a presence and an absence of a digital signal;
      (2) if no digital signal is detected, determining that the message is a voice message;
      (3) if a digital signal is detected, determining a frequency of the received signal; and
      (4) determining the communications device type from the determined frequency;
   c. selecting a personality and rules set according to the determined communnications device type;
   d. determining if the request is to one of store and retrieve a message;
   e. if it is determined that the request is to store a message, then:
      (1) receiving the message from the communications network via the entry point;
      (2) processing the message;
      (3) storing the processed message; and
   f. if it is determined that the message is to be retrieved, then:
      (1) retrieving the message from storage; and
      (2) delivering the message to the communications network.

10. The method of claim 9, further including before the step of storing the message, determining a recipient of the message.

11. The method of claim 10, wherein the step of determining the recipient further includes the step of using a number called to deliver the request to the entry point.

12. The method of claim 10, wherein the step of determining the recipient further includes the step of selecting the recipient from a list of possible recipients.

13. The method of claim 10, wherein the step of determining the recipient further includes the step of providing a recipient identifier.

14. The method of claim 9, further including before the step of storing the message, compressing the message.

15. The method of claim 9, wherein the step of processing further includes converting the message from analog format to digital format.

16. The method of claim 9, wherein the step of processing further includes converting the message into a desired format.

17. The method of claim 9, wherein the step of retrieving further includes converting the message from digital format to analog format.

18. The method of claim 9, wherein the step of retrieving further includes converting the message into a desired format.

19. A method for providing data messaging in a communications network, comprising the steps of:
   a. receiving a request from a communications device at an entry point;
   b. determining the communications device type issuing the received request;
   c. selecting a personality and rules set according to the determined communications device type;
   d. determining an access level of the request by:
      (1) determining if the access level is one of a subscriber, a secondary user, and a user;
      (2) providing a subscriber with a first access level;
      (3) providing a secondary user with a second access level; and
      (4) providing a user with a third access level;
   e. determining if the request is to one of store and retrieve a message;
   f. if it is determined that the request is to store a message, then:
      (1) receiving the message from the communications network via the entry point;
      (2) processing the message;
      (3) storing the processed message; and
   g. if it is determined that the message is to be retrieved, then:
      (1) retrieving the message from storage; and
      (2) delivering the message to the communications network.

20. The method of claim 19, wherein the step of determining an access level includes the steps of:
   a. receiving a user identification; and
   b. determining the access level based on the received user identification.

21. The method of claim 20, wherein the step of receiving a user identification includes receiving DTMF signals.

22. The method of claim 20, wherein the step of receiving a user identification includes:
   a. receiving a voice signal; and
   b. using a speech recognition device, converting the voice signal into a digital signal.

23. The method of claim 20, wherein the step of receiving a user identification includes receiving computer text.

24. A messaging architecture for use in a communications network, comprising:
   a. a communications entry point configured to receive requests to send and receive messages to and from the communications network;
   b. a plurality of personality and rules sets configured to process communications in a number of formats;

c. a digital signal processor connected to the entry point and being configured:
  (1) to select one of the personality and rules sets according to a format of a communication;
  (2) to determine an access level of a received request by determining if the access level is one of a subscriber, a secondary user, and a user: and
  (3) to provide a subscriber with a first access level, provide a secondary user with a second access level, and provide a user with a third access level; and
d. data storage configured to be responsive to the personality and rules sets.

25. A messaging architecture for use in a communications network connected to a local area network (LAN), comprising:
  a. an entry point configured to transmit and receive messages between the communications network and the LAN;
  b. a number of workstations connected to the LAN, each workstation having:
    (1) a network interface card (NIC) configured to transmit and receive messages between the LAN and the workstation;
    (2) a processor connected to the NIC and configured to process received messages and to determine an access level of a received request by determining if the access level is one of a subscriber, a secondary user, and a user; and to provide a subscriber with a first access level, provide a secondary user with a second access level, and provide a user with a third access level; and the processor having:
      i. a plurality of personality and rules sets configured to process messages in a number of formats; and
      ii. a digital signal processor in communication with the entry point and configured to select one of the personality and rules sets according to a format of a received message; and
    (3) an operating system connected to the processor; and
  c. a storage device connected to the LAN and configured to store messages.

* * * * *